United States Patent Office 3,299,068
Patented Jan. 17, 1967

3,299,068
2,4-DIAMINO-5,6,7,8-TETRAHYDRO-6-PHENYL-QUINAZOLINE AND CONGENERS
Leland J. Chinn, Morton Grove, Ill., assignor to G. D. Searle & Co., Chicago, Ill., a corporation of Delaware
No Drawing. Filed Feb. 10, 1966, Ser. No. 526,343
13 Claims. (Cl. 260—256.4)

This invention relates to 2,4-diamino-5,6,7,8-tetrahydro-6-phenylquinazoline and congeners, and to processes for the preparation thereof. More particularly, this invention provides new, useful, and unobvious chemical compounds of the formula

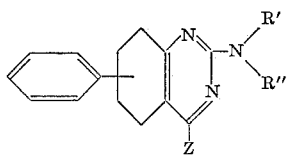

wherein R' and R" each represent hydrogen or a lower alkanoyl radical and Z represents the primary amino radical, —NH$_2$; the secondary or tertiary amino radical resulting from substitution of one or each hydrogen in the primary amino radical by a lower alkyl, lower alkanoyl, or hydroxy(lower alkyl) radical; a saturated cyclic amino radical attached to the tetrahydroquinazoline nucleus via nitrogen, such as pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, etc.; a di(lower alkyl)amino(lower alkyl)amino radical; or an azido radical. Alternatively, Z represents halogen of atomic number greater than 9 but less than 53 (viz., chlorine or bromine) or hydroxyl optionally esterified by a lower alkanoic acid. The latter, non-nitrogenous embodiments of Z primarily give rise to intermediates whereby the other compounds of the invention are prepared, but also share in the pharmacological utility of the invention hereinafter set forth.

Those skilled in the art will recognize that a lower alkyl radical is a monovalent, saturated, acyclic, straight- or branched-chain, hydrocarbon grouping of empirical formula —C$_n$H$_{2n+1}$ in which $n$ represents a positive integer less than 8. Illustrative of such groupings are methyl, ethyl, propyl, isopropyl, butyl, isobutyl, sec-butyl, tert-butyl, pentyl, neopentyl, hexyl, isohexyl, heptyl, etc. It follows that lower alkanoyl radicals have the formula —CO—lower alkyl and hydroxy(lower alkyl) and di(lower alkyl)amino(lower alkyl)amino radicals are enformulated thus —lower alkylene—OH
—NH—lower alkylene—N(lower alkyl)$_2$ respectively, the lower alkylene constituent being a bivalent, saturated, acyclic, straight- or branched-chain, hydrocarbon grouping of the formula —C$_n$H$_{2n}$— wherein $n$ has the meaning previously assigned. Typical lower alkylene radicals are methylene, ethylene, trimethylene, propylene, tetramethylene, 1,1-dimethylethylene, pentamethylene, 2,2-dimethyltrimethylene, etc. Consistent with the above, a lower alkanoic acid is defined as an acid of the formula lower alkyl—COOH When Z in the generic formula for compounds of this invention represents hydroxyl, the resultant compounds can and do reversibly tautomerize to corresponding ketones

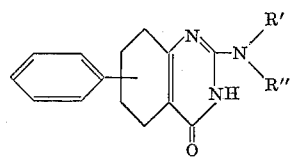

the proportions of the two tautomeric forms present in any given circumstance being dependent upon the physical state of the substance involved and its environment, i.e., whether it be solid or liquid and, if dissolved, in what solvent, at what temperature, and at what pH. Because such various tautomers cannot readily be represented by a single formula, the relevant compounds are named and enformulated hereinafter exclusively as alcohols for convenience only; both oxo and hydroxy forms, notwithstanding, are within the ambit of the described invention.

The compounds to which this invention relates are useful by reason of their valuable pharmacological properties. In particular, they are anti-protozoal agents effective against *Tetrahymena gelleii*. They are also, variously, anti-bacterial in respect of *Diplococcus pneumoniae*, anti-secretory, ulcer-inhibiting, and adapted to reduce exogenously-induced hypercholesterolemia.

Equivalent to the basic amines of this invention for the purposes herein described are corresponding non-toxic acid addition salts of the formula

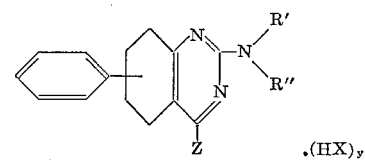

wherein R', R", and Z retain the meanings previously assigned; X represents one equivalent of an anion—for example, chloride, bromide, iodide, nitrate, phosphate, sulfate, sulfamate, methyl sulfate, ethyl sulfate, benzenesulfonate, toluenesulfonate, camphorsulfonate, acetate, lactate, succinate, malate, maleate, tartrate, citrate, gluconate, ascorbate, benzoate, cinnamate, or the like— which, in combination with the cationic portion of a salt aforesaid, is neither pharmacologically nor otherwise undesirable in pharmaceutical dosage; and $y$ represents a positive integer less than 4, its precise value being dependent upon the number of basic hydrogen atoms involved in salt formation.

Preparation of the 2,4-di(primary amino) compounds of this invention and their N-lower alkanoyl derivatives proceeds by contacting an appropriate phenylcyclohexanone

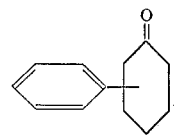

with ethyl formate in the presence of sodium methoxide, using cold benzene as the reaction medium, to produce the corresponding 2 - hydroxymethylenecyclohexanone, which is cyclized to the isoxazole

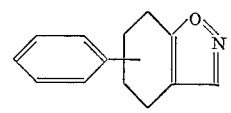

by heating with hydroxylamine hydrochloride in glacial acetic acid. From the isoxazole, the corresponding 2-oxocyclohexanecarbonitrile is obtained on heating with sodium ethoxide in ethanol. The carbonitrile affords the diamino compound

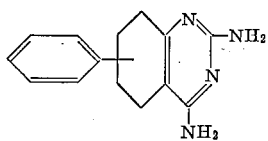

on condensation with guanidine in the presence of sodium ethoxide, hot ethanol again being the reaction medium. N-lower alkanoyl derivatives of the diamines are prepared by contacting the latter with a suitable lower alkanoic acid anhydride or chloride in acetic acid medium, pyridine being introduced and heating employed as hereinafter illustrated to vary the number of lower alkanoyl groups incorporated.

Alternatively, the appropriate phenylcyclohexanone aforesaid is heated with diethyl carbonate in the presence of sodium hydride to give the corresponding ethyl 2-oxocyclohexanecarboxylate

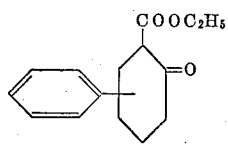

which is condensed with guanidine carbonate in boiling ethanol to give the quinazolinol

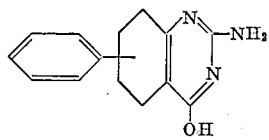

The quinazolinol is acylated by the same general techniques which apply to the diamino compounds hereof disclosed above and, further, affords the 4-halo compounds of the invention on heating with phosphorus oxychloride or oxybromide. From the halo compounds the remaining compounds of this invention, excepting acid addition salts, are obtained by heating with an appropriate amine or sodium azide (the latter in the presence of aqueous dimethyl sulfoxide), Z' being representative of a (lower alkyl)amino, di(lower alkyl)amino, hydroxy(lower alkyl)amino, saturated cyclic amino, or di(lower alkyl)amino (lower alkyl)amino radical.

Conversion of the basic amines of this invention to corresponding acid addition salts is accomplished by mixing the bases with from 1 to 3 equivalents, as indicated, of any of various inorganic and strong organic acids, the anionic portion of which conforms to X as hereinbefore defined.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *2-hydroxymethylene-4-phenylcyclohexanone.*—To a stirred mixture of 45 parts of ethyl formate and 12 parts of sodium methoxide in 90 parts of dry benzene maintained at approximately 5° under nitrogen is added, portionwise, a solution of 35 parts of 4-phenylcyclohexanone in 90 parts of dry benzene. Stirring at 5° under nitrogen is continued until the reaction mixture solidifies, whereupon the mixture is allowed to stand at 5° under nitrogen for 1½ hours and is then diluted with 2 volumes of water. The resultant mixture is separated into aqueous and organic phases. The organic phase is consecutively extracted with cold water and cold aqueous 5% sodium hydroxide, and these extracts are combined with the aqueous phase. The mixture thus obtained is acidified with a 3:1 mixture of ice and concentrated hydrochloric acid. Upon evaporation of residual benzene and agitation, 2-hydroxymethylene-4-phenylcyclohexanone crystallizes out. Isolated by filtration, washed with water, and dried in air, the product melts at 83–84.5°.

B. *4,5,6,7-tetrahydro - 5-phenyl - 1,2-benzisoxazole.*—A solution of 14 parts of 2-hydroxymethylene-4-phenylcyclohexanone and 7 parts of hydroxylamine hydrochloride in 100 parts of glacial acetic acid is heated at the boiling point under reflux for ½ hour, then freed of acetic acid by vacuum distillation. The residue is diluted with 11 volumes of water. From the resultant mixture, on cooling in the range 0–5°, 4,5,6,7-tetrahydro-5-phenyl-1,2-benzisoxazole precipitates as a tan solid which, isolated by filtration, washed with water, and dried in air, melts at 85–91°.

C. *2-oxo-5-phenylcyclohexanecarbonitrile.*—To a solution of 7 parts of sodium in 800 parts of absolute ethanol is added 50 parts of 4,5,6,7-tetrahydro-5-phenyl-1,2-benzisoxazole. The resultant mixture is heated at the boiling point under reflux for ½ hour, then stripped of ethanol by vacuum distillation. The residue is diluted with 20 volumes of water. The mixture thus obtained is acidified with 5% hydrochloric acid, whereupon the oil which precipitates is extracted with ether. The ether extract is washed with water, dried over anhydrous sodium sulfate, and stripped of solvent by vacuum distillation. The residue, a viscous brown oil, is 2-oxo-5-phenylcyclohexanecarbonitrile. The product imparts a brownish-green color to an alcoholic solution of ferric chloride.

D. *2,4-diamino - 5,6,7,8-tetrahydro-6 - phenylquinazoline.*—To a solution of 134 parts of sodium in 3200 parts of absolute ethanol is added 555 parts of guanidine hydrochloride. The resultant mixture is heated at the boiling point under reflux for 10 minutes, whereupon the sodium chloride which precipitates is removed by filtration. The filtrate is combined with 558 parts of 2-oxo-5-phenylcyclohexanecarbonitrile, and the mixture thus obtained is heated at the boiling point under reflux for 5 days, then cooled to room temperature. Insoluble solids are filtered off, washed with ethanol, and dried in air. Crystallization from ethyl acetate affords 2,4-diamino-5,6,7,8-tetrahydro-6-phenylquinazoline as colorless plates melting at 261.5–263°. The product has the formula

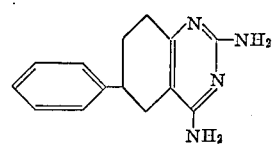

E. *2,4-diamino - 5,6,7,8-tetrahydro-6 - phenylquinazoline hemi-d-tartrate.*—To a hot solution of 48 parts of 2,4-diamino-5,6,7,8-tetrahydro-6-phenylquinazoline in a mixture of 2070 parts of ethyl acetate and 1600 parts of acetone is added a solution of 15 parts of *d*-tartaric acid in 320 parts of acetone. The resultant mixture is allowed to stand at room temperatures for 1½ hours. The solid precipitate thrown down is 2,4-diamino-5,6,7,8-tetrahydro-6 - phenylquinazoline hemi-*d*-tartrate which, isolated by filtration, washed with ethyl acetate, dried in air, and recrystallized from absolute ethanol, is obtained as colorless platelets melting at 244–246°.

F. *2,4-diamino-5,6,7,8 - tetrahydro-6-phenylquinazoline d-10-camphorsulfonate.*—To a hot solution of 24 parts of 2,4-diamino-5,6,7,8-tetrahydro-6-phenylquinazoline in 2400 parts of 95% ethanol is added a solution of 12 parts of d-10-camphorsulfonic acid in 480 parts of 95% ethanol. The resultant mixture is allowed to stand at room temperatures for 2 hours, then diluted with an equal volume of anhydrous ether. A crystalline precipitate is thrown down. The precipitate is filtered off, dried in air, and recrystallized from a mixture of ethanol and ether to give 2,4-diamino-5,6,7,8-tetrahydro-6-phenylquinazoline d-10-camphorsulfonate as colorless rhombs melting above 300° with decomposition.

*Example 2*

A. *2-hydroxymethylene-6-phenylcyclohexanone.*—To a stirred mixture of 45 parts of ethyl formate and 12 parts of sodium methoxide in 90 parts of dry benzene maintained at approximately 5° under nitrogen is added, portionwise, a solution of 35 parts of 2-phenylcyclohexanone in 90 parts of dry benzene. Stirring at 5° under nitrogen is continued for 1½ hours, whereupon the reaction mixture is diluted with an equal volume of water. The resultant mixture is separated into aqueous and organic phases. The organic phase is consecutively extracted with cold water and cold aqueous 5% sodium hydroxide, and these extracts are combined with the aqueous phase. The combined material is acidified with a 3:1 mixture of ice and concentrated hydrochloric acid, then extracted with ether. The ether extract is washed with water, dried over anhydrous sodium sulfate, and stripped of solvent by vacuum distillation to give 2-hydroxymethylene-6-phenylcyclohexanone as a viscous orange oil. The product imparts a purple color to an alcoholic solution of ferric chloride.

B. *4,5,6,7-tetrahydro-7-phenyl-1,2-benzisoxazole.* — A solution of 14 parts of 2-hydroxymethylene-6-phenyl-cyclohexanone and 7 parts of hydroxylamine hydrochloride in 100 parts of glacial acetic acid is heated at the boiling point under reflux for 20 minutes, then freed of acetic acid by vacuum distillation. The residue is diluted with 11 volumes of water, whereupon a brown oil precipitates. The oil granulates on cooling in the range 0–5°. The granular product thus obtained is 4,5,6,7-tetrahydro-7-phenyl-1,2-benzisoxazole, which, separated by filtration, washed with water, and dried in air, melts in the range 55–60°.

C. *2-oxo-3-phenylcyyclohexanecarbonitrile.* — To a stirred solution of 7 parts of sodium in 800 parts of absolute ethanol is added 50 parts of 4,5,6,7-tetrahydro-7-phenyl-1,2-benzisoxazole. The resultant mixture is heated at the boiling point under reflux with stirring for ½ hour, then cooled to room temperature and diluted with 2 volumes of a saturated aqueous solution of ammonium chloride. Alcohol is removed by vacuum distillation. The residue is chilled to 5° and insoluble solids filtered therefrom. The material thus isolated is 2-oxo-3-phenylcyclohexanecarbonitrile which, washed with water, dried in air, and crystallized from a mixture of ethyl acetate and ether, is obtained as colorless nondescript crystals melting at 143.5–145°.

D. *2,4 - diamino - 5,6,7,8 - tetrahydro - 8 - phenylquinazoline.*—To a solution of 134 parts of sodium in 3200 parts of absolute ethanol is added 555 parts of guanidine hydrochloride. The resultant mixture is heated at the boiling point under reflux for 10 minutes, whereupon the sodium chloride which precipitates is filtered out. The filtrate is combined with 555 parts of 2-oxo-3-phenylcyclohexanecarbonitrile, and the mixture thus obtained is heated at the boiling point under reflux for 5 days, then cooled to room temperature and diluted with an equal volume of water. The precipitate thrown down is 2,4- diamino-5,6,7,8-tetrahydro-8-phenylquinazoline, which is isolated by filtration, washed with water, and dried in air. The product has the formula

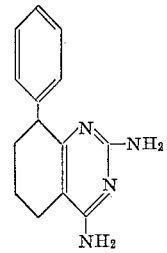

*Example 3*

A. *Ethyl 2-oxo-5-phenylcyclohexanecarboxylate.*—The oil is removed from 5 parts of a 56% dispersion of sodium hydride in mineral oil by washing with pentane under nitrogen, whereupon 98 parts of diethyl carbonate is added and the resultant mixture stirred at the boiling point under reflux while a solution of 20 parts of 4-phenylcyclohexanone in 98 parts of diethyl carbonate, a catalytic amount of absolute ethanol, and the sodium hydride obtained by washing 2 parts of a 56% dispersion thereof in mineral oil with pentane under nitrogen are consecutively introduced. Copious gas evolution occurs during introduction of the 4-phenylcyclohexanone solution. The reaction mixture is heated at the boiling point under reflux for 16 hours, then cooled, diluted with 11 volumes of ice water, and neutralized with concentrated hydrochloric acid. The mixture thus obtained is extracted with ether. The ether extract is washed successively with water and a saturated aqueous solution of sodium chloride, dried over anhydrous sodium sulfate, and stripped of solvent and unreacted diethyl carbonate by vacuum distillation. The residue, a viscous orange oil, is ethyl 2-oxo-5-phenylcyclohexanecarboxylate. The product imparts a violet color to an alcoholic solution of ferric chloride.

B. *2 - amino - 5,6,7,8 - tetrahydro - 6 - phenyl - 4 - quinazolinol.*—To a solution of 155 parts of ethyl 2-oxo-5-phenylcyclohexanecarboxylate in 640 parts of absolute ethanol is added 60 parts of guanidine carbonate. The resultant mixture is heated at the boiling point under reflux for 4 days, then cooled and neutralized with concentrated hydrochloric acid. The solid precipitate thrown down is filtered off, consecutively washed with water and 95% ethanol, dried in air, and crystallized from a mixture of dimethylformamide and water to give 2-amino-5,6,7,8-tetrahydro-6-phenyl-4-quinazolinol as colorless rhombs melting above 300°. The product has the formula

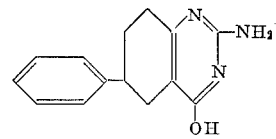

*Example 4*

*2 - acetylamino - 5,6,7,8 - tetrahydro - 6 - phenyl - 4-quinazolinol.*—A mixture of 34 parts of 2-amino-5,6,7,8-tetrahydro-6-phenyl-4-quinazolinol, 500 parts of pyridine, and 500 parts of acetic anhydride is heated at around 95° for 20 hours, then poured into 20 volumes of water. Insoluble solids thrown down are filtered off, washed with water, dried in air, and crystallized from aqueous dioxane to give 2-acetylamino-5,6,7,8-tetrahydro-6-phenyl-4-quinazolinol as colorless rhombs melting above 300°. The product has the formula

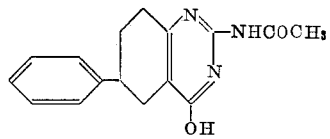

Example 5

4 - acetoxy - 2 - diacetylamino - 5,6,7,8 - tetrahydro - 6-phenylquinazoline.—A mixture of 5 parts of 2-amino-5,6,7,8-tetrahydro-6-phenyl-4-quinazolinol and 200 parts of acetic anhydride is heated at the boiling point under reflux with agitation for 7 days, during which time complete solution occurs. The solution is concentrated to approximately 1/10 its original volume by vacuum distillation, and the concentrate is diluted with 20 volumes of ice water. Precipitation occurs. The precipitate is filtered off, washed with water, dried in air, and taken up in ether. The ether solution is treated with decolorizing charcoal and filtered. Most of the ether is removed from the filtrate by distillation, whereupon sufficient hexane is added to induce crystallization. The crystals are isolated by filtration and recrystallized from a mixture of ether and hexane to give 4-acetoxy-2-diacetylamino-5,6,7,8-tetrahydro-6-phenylquinazoline as colorless laths melting at approximately 157.5–158.5°. The product has the formula

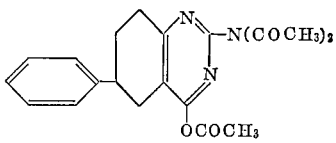

Example 6

A. 2 - amino-4-chloro-5,6,7,8-tetrahydro-6-phenylquinazoline.—A mixture of 5 parts of 2-amino-5,6,7,8-tetrahydro-6-phenyl-4-quinazolinol and 25 parts of phosphorus oxychloride is heated at the boiling point under reflux for 30 minutes, then cooled and poured onto ice. The resultant mixture is made basic with concentrated ammonium hydroxide. The oil which precipitates solidifies on standing. The resultant solids, isolated by filtration, washed with water, dried in air, and crystallized from methanol, afford 2 - amino-4-chloro-5,6,7,8-tetrahydro-6-phenylquinazoline as a yellow solid melting at approximately 212–213°.

B. 2-amino-5,6,7,8-tetrahydro-4-methylamino-6-phenylquinazoline.—A mixture of 2 parts of 2-amino-4-chloro-5,6,7,8-tetrahydro-6-phenylquinazoline and 70 parts of methylamine is maintained in a sealed vessel at 120° for 48 hours, then distilled nearly to dryness in vacuo. The residue is diluted with 10 volumes of water and a like quantity of aqueous 5% sodium hydroxide. The resultant mixture is extracted with ethyl acetate. The ethyl aceate extract is washed with water, dried over anhydrous sodium sulfate, and stripped of solvent by vacuum distillation to give 2-amino-5,6,7,8-tetrahydro-4-methylamino-6-phenylquinazoline as the residue. The product has the formula

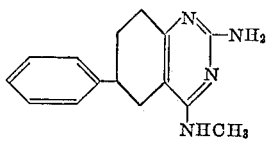

Example 7

2 - amino - 4 - bromo-5,6,7,8-tetrahydro-6-phenylquinazoline.—A mixture of 5 parts of 2-amino-5,6,7,8-tetrahydro-6-phenyl-4-quinazolinol and 42 parts of phosphorus oxybromide is heated at 110° for 30 minutes, then cooled and poured onto ice. The resultant mixture is made basic with concentrated ammonium hydroxide. The mixture thus obtained is extracted with ethyl acetate. The ethyl acetate extract is washed with water, dried over anhydrous sodium sulfate, and stripped of solvent by vacuum distillation to give 2-amino-4-bromo-5,6,7,8-tetrahydro-6-phenylquinazoline as the residue. The product has the formula

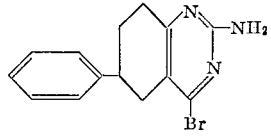

Example 8

2 - amino - 4 - dipropylamino - 5,6,7,8 - tetrahydro - 6-phenylquinazoline.—A mixture of 2 parts of 2-amino-4-chloro - 5,6,7,8 - tetrahydro - 6-phenylquinazoline and 35 parts of dipropylamine is heated at the boiling point under reflux with agitation for 9 days, then distilled nearly to dryness in vacuo. The residue is chilled and thereupon diluted with 10 volumes of water. To the resultant mixture is added an equal volume of aqueous 5% sodium hydroxide. A gum forms, which is extracted with ethyl acetate. The ethyl acetate extract is washed with water, dried over anhydrous sodium sulfate, and stripped of solvent by vacuum distillation. The residue is chromatographed on alumina, using benzene and ethyl acetate as developing solvents. From an eluate comprising 70% ethyl acetate in benzene, on evaporation of solvent and recrystallization of the residue from a mixture of ethyl aceate, ether, and hexane, 2-amino-4-dipropylamino-5,6,7,8 - tetrahydro - 6 - phenylquinazoline is obtained as colorless prisms melting at approximately 129.5–130.5°. The product has the formula

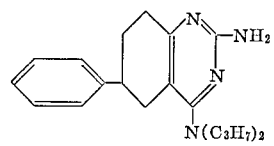

Example 9

N-acetyl 2,4-diamino-5,6,7,8-tetrahydro-6-phenylquinazoline.—A mixture of 2 parts of 2,4-diamino-5,6,7,8-tetrahydro-6-phenylquinazoline and 10 parts of acetic anhydride is heated at the boiling point under reflux for 2 hours, then concentrated nearly to dryness by vacuum distillation. The residue is partitioned between water and ethyl acetate. The ethyl acetate phase is separated; successively washed with water, aqueous 5% sodium bicarbonate, and a saturated aqueous solution of sodium chloride; dried over anhydrous sodium sulfate; and freed of solvent by vacuum distillation. The residue is chromatographed on neutral alumina, using benzene and ethyl acetate as developing solvents. From an eluate comprising 50% ethyl acetate in benzene, on evaporation of solvent and crystallization of the residue from ethanol, N-acetyl 2,4-diamino-5,6,7,8-tetrahydro-6-phenylquinazoline is obtained as colorless, rectangular plates melting at 259.5–261°. The product has the formula

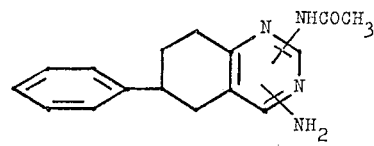

Example 10

N,N,N'-triacetyl 2,4-diamino-5,6,7,8-tetrahydro-6-phenylquinazoline.—A mixture of 1 part of 2,4-diamino-5,6,7,8-tetrahydro-6-phenylquinazoline, 10 parts of pyridine, and 10 parts of acetic anhydride is stirred at room temperatures for 7 days, then poured into ice water. The oil thrown down granulates on standing. The granules are isolated by filtration, washed with water, dried in air, and crystallized from a mixture of ether and pentane to give N,N,N'-triacetyl 2,4-diamino-5,6,7,8-tetrahydro-6-phenylquinazoline as yellow rods melting at 177–179.5°. The product has the formula

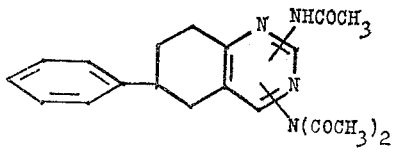

*Example 11*

2,4-bis(diacetylamino)-5,6,7,8-tetrahydro-6-phenylquinazoline.—A mixture of 4 parts of 2,4-diamino-5,6,7,8-tetrahydro-6-phenylquinazoline, 35 parts of pyridine, and 35 parts of acetic anhydride is heated at around 95° for 22 hours, then cooled and poured into ice water. Insoluble solids are separated from the resultant mixture by filtration, washed well with water, dried in air, and crystallized from ethanol to give 2,4-bis(diacetylamino)-5,6,7,8-tetrahydro-6-phenylquinazoline as colorless prisms melting at 214–216°. The product has the formula

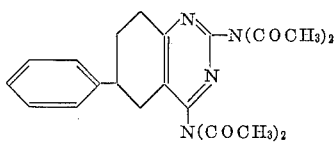

*Example 12*

2-amino-5,6,7,8-tetrahydro-4-(2-hydroxyethylamino)-6-phenylquinazoline.—A mixture of 1 part of 2-amino-4-chloro-5,6,7,8-tetrahydro-6-phenylquinazoline and 20 parts of 2-aminoethanol is heated at the boiling point with agitation under reflux for 15 hours, then distilled nearly to dryness in vacuo. The residue is cooled and diluted with 10 volumes each of water and aqueous 5% sodium hydroxide. The resultant mixture is extracted with ethyl acetate. The ethyl acetate extract is washed with water, dried over anhydrous sodium sulfate, and stripped of solvent by vacuum distillation. The residue, crystallized from aqueous methanol, affords 2-amino-5,6,7,8-tetrahydro-4-(2-hydroxyethylamino)-6-phenylquinazoline as pale yellow crystals melting at 214–216°. The product has the formula

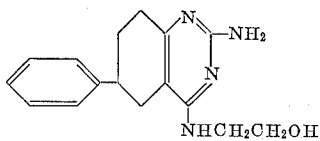

*Example 13*

2-amino-5,6,7,8-tetrahydro-4-(2-hydroxypropylamino)-6-phenylquinazoline.—A mixture of 2 parts of 2-amino-4-chloro-5,6,7,8-tetrahydro-6-phenylquinazoline and 40 parts of 1-amino-2-propanol is heated at the boiling point under reflux with agitation for 15 hours, then distilled nearly to dryness in vacuo. The residue is diluted with 10 volumes each of water and aqueous 5% sodium hydroxide. The resultant mixture is extracted with ethyl acetate. The ethyl acetate extract is washed with water, dried over anhydrous sodium sulfate, and stripped of solvent by vacuum distillation to give 2-amino-5,6,7,8-tetrahydro-4-(2-hydroxypropylamino)-6-phenylquinazoline as the residue. The product has the formula

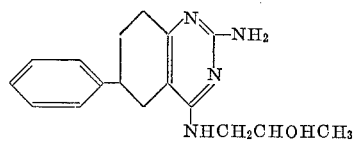

*Example 14*

2-amino-5,6,7,8-tetrahydro-6-phenyl-4-pyrrolidinoquinazoline.—A mixture of 2 parts of 2-amino-4-chloro-5,6,7,8-tetrahydro-6-phenylquinazoline and 34 parts of pyrrolidine is maintained at 110° in a sealed vessel for 15 hours, then distilled nearly to dryness in vacuo. The residue is diluted with 10 volumes each of water and aqueous 5% sodium hydroxide. The resultant mixture is extracted with ethyl acetate. The ethyl acetate extract is washed with water, dried over anhydrous sodium sulfate, and freed of solvent by vacuum distillation. The residue is 2-amino-5,6,7,8-tetrahydro-6-phenyl-4-pyrrolidinoquinazoline, having the formula

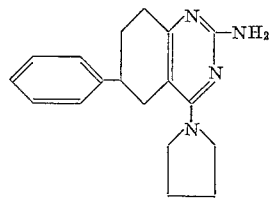

*Example 15*

2-amino-5,6,7,8-tetrahydro-6-phenyl-4-piperidinoquinazoline.—A mixture of 16 parts of 2-amino-4-chloro-5,6,7,8-tetrahydro-6-phenylquinazoline and 170 parts of piperidine is heated at the boiling point under reflux for 15 hours, then distilled nearly to dryness in vacuo. The residue is cooled and thereupon diluted with 10 volumes each of water and aqueous 5% sodium hydroxide. An oil is thrown down, which granulates on standing. The granular product is filtered off, washed with water, dried in air, and crystallized from ethyl acetate to give 2-amino-5,6,7,8-tetrahydro-6-phenyl-4-piperidinoquinazoline as yellow crystals melting in the range 208.5–216.5°. The product has the formula

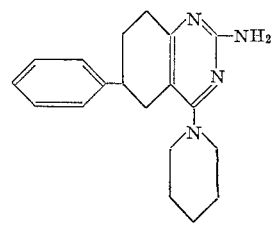

*Example 16*

2-amino-5,6,7,8-tetrahydro-4-morpholino-6-phenylquinazoline.—A mixture of 1 part of 2-amino-4-chloro-5,6,7,8-tetrahydro-6-phenylquinazoline and 20 parts of morpholine is heated at the boiling point under reflux for 15 hours, then distilled nearly to dryness in vacuo. The residue is diluted with 10 volumes each of water and aqueous 5% sodium hydroxide. Insoluble solids are filtered out, washed with water, dried in air, and crystallized from ethyl acetate to give 2-amino-5,6,7,8-tetrahydro-4-morpholino-6-phenylquinazoline as a pale yellow solid melting at 218.5–220°. The product has the formula

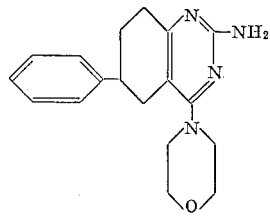

*Example 17*

2-amino-4-(2-dimethylaminoethylamino)-5,6,7,8-tetrahydro-6-phenylquinazoline.—A mixture of 1 part of 2-amino-4-chloro-5,6,7,8-tetrahydro-6-phenylquinazoline and approximately 20 parts of 2-dimethylaminoethylamine is heated at the boiling point under reflux for 25 hours, then distilled nearly to dryness in vacuo. The residue is diluted with 10 volumes each of water and aqueous 5% sodium hydroxide. The resultant mixture is extracted with ether. The ether extract is washed with water, dried over anhydrous sodium sulfate, and stripped of most of the solvent by distillation. The residue crystallizes on chilling in the range 0–5°. Recrystallization from ether affords 2-amino-4-(2-dimethylaminoethylamino)-5,6,7,8-tetrahydro-6-phenylquinazoline as a colorless solid melting at approximately 163.5–164.5°. The product has the formula

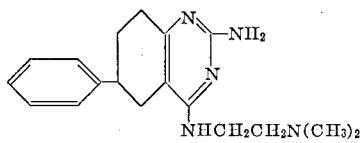

Example 18

2 - amino-4-(3-diethylaminopropylamino)-5,6,7,8-tetrahydro-6-phenylquinazoline.—A mixture of 1 part of 2-amino - 4 - chloro-5,6,7,8-tetrahydro-6-phenylquinazoline and approximately 20 parts of 3-diethylaminopropylamine is heated at the boiling point under reflux for 24 hours, then distilled nearly to dryness in vacuo. The residue is diluted with 10 volumes each of water and aqueous 5% sodium hydroxide. The resultant mixture is extracted with ether. The ether extract is washed with water, dried over anhydrous sodium sulfate, and freed of solvent by vacuum distillation. The residue is 2-amino-4-(3 - diethylaminopropylamino)-5,6,7,8-tetrahydro-6-phenylquinazoline, having the formula

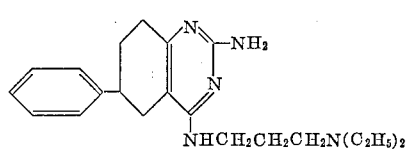

Example 19

2 - amino-4-azido-5,6,7,8-tetrahydro-6-phenylquinazoline.—A mixture of 8 parts of 2-amino-4-chloro-5,6,7,8-tetrahydro-6-phenylquinazoline, 3 parts of sodium azide, 55 parts of dimethyl sulfoxide, and 5 parts of water is maintained at 70° for 6½ hours with occasional agitation. The resultant mixture is poured into 20 volumes of ice water. Insoluble solids are collected on a filter, washed well with water, dried in air, and crystallized from methanol to give 2-amino-4-azido-5,6,7,8-tetrahydro-6-phenylquinazoline as colorless plates melting at 237.5–240.5°. The product has the formula

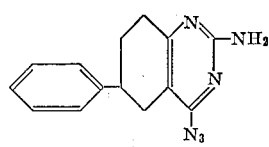

What is claimed is:
1. A compound of the formula

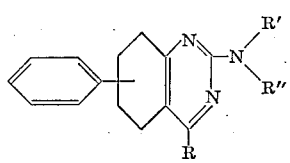

wherein R represents a member of the group consisting of chlorine, bromine, and a radical of the formula

—NH$_2$ lower alkyl-NH

—N(lower alkyl)$_2$

HNCO-lower alkyl

—N(CO—lower alkyl)$_2$

HO-lower alkylene-NH

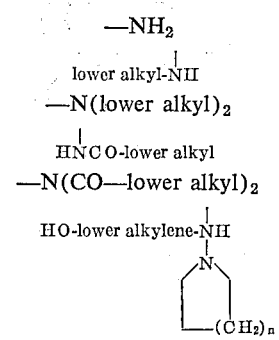

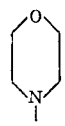

HN-lower alkylene-N(lower alkyl)$_2$

—N$_3$

—OH

—OCO—lower alkyl

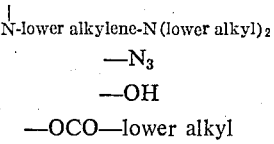

$n$ being a positive integer less than 3, and R' and R" each represent a member of the group consisting of hydrogen and a radical of the formula —CO—lower alkyl except when R represents chlorine or bromine, in which event R' and R" each represent hydrogen only.

2. A compound according to claim 1 wherein R represents the amino radical, and R' and R" each represent hydrogen.

3. A compound according to claim 1 which is 2,4-diamino-5,6,7,8-tetrahydro-6-phenylquinazoline.

4. A compound according to claim 1 which is 2-amino-5,6,7,8-tetrahydro-6-phenyl-4-quinazolinol.

5. A compound according to claim 1 wherein the phenyl radical called for is in the 6-position on the quinazoline nucleus, R represents halogen of atomic number greater than 9 and less than 53, and R' and R" each represents hydrogen.

6. A compound according to claim 1 which is 2-amino-4-chloro-5,6,7,8-tetrahydro-6-phenylquinazoline.

7. A compound according to claim 1 which is N,N,N'-triacetyl 2,4 - diamino - 5,6,7,8 - tetrahydro-6-phenylquinazoline.

8. A compound according to claim 1 wherein the phenyl radical called for is in the 6-position, R represents a radical of the formula

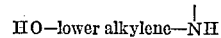

and R' and R" each represents hydrogen.

9. A compound according to claim 1 which is 2-amino-5,6,7,8 - tetrahydro - 4 - (2 - hydroxyethylamino) - 6-phenylquinazoline.

10. A compound according to claim 1 wherein the phenyl radical called for is in the 6-position, R represents a radical of the formula

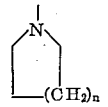

in which $n$ represents a positive integer less than 3, and R' and R" each represent hydrogen.

11. A compound according to claim 1 which is 2-amino - 5,6,7,8 - tetrahydro - 6 - phenyl - 4 - piperidinoquinazoline.

12. A compound according to claim 1 wherein the phenyl radical called for is in the 6-position, R represents a radical of the formula

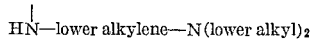

and R' and R" each represent hydrogen.

13. A compound according to claim 1 which is 2-amino - 4 - (2 - dimethylaminoethylamino) - 5,6,7,8 - tetrahydro-6-phenylquinazoline.

References Cited by the Examiner
FOREIGN PATENTS 583,815   12/1946   Great Britain.

OTHER REFERENCES

Kano, Chem. Abstracts, volume 55, 1961, p. 11445h.
Modest et al., Jour. Org. Chem., volume 27, 1962, pp. 2708–2709.

ALEX MAZEL, *Primary Examiner.*

MARY U. O'BRIEN, *Assistant Examiner.*

UNITED STATES PATENT OFFICE
CERTIFICATE OF CORRECTION

Patent No. 3,299,068 January 17, 1967

Leland J. Chinn

It is hereby certified that error appears in the above numbered patent requiring correction and that the said Letters Patent should read as corrected below.

Column 2, lines 65 to 69, for the right-hand portion of the formula reading

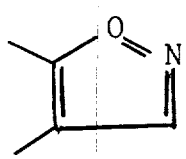   read   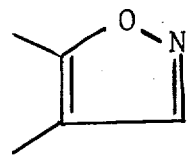

column 5, line 50, for "phenylcyyclohexanecarbonitrile" read -- phenylcyclohexanecarbonitrile --; column 6, line 41, for "155" read -- 15 --; column 8, line 21, for "distillation," read -- distillation. --; column 8, line 27, for "aceate" read -- acetate --; line 46, for "aqueuos" read -- aqueous --; column 12, lines 14 to 19, the formulas should appear as shown below instead of as in the patent:

HO-lower alkylene-NH

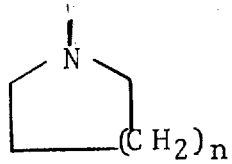

Signed and sealed this 14th day of November 1967.

(SEAL)
Attest:

EDWARD M. FLETCHER, JR.　　　　　　　　EDWARD J. BRENNER
Attesting Officer　　　　　　　　　　　Commissioner of Patents

UNITED STATES PATENT OFFICE
CERTIFICATE OF CORRECTION

Patent No. 3,299,068                         January 17, 1967

Leland J. Chinn

It is hereby certified that error appears in the above numbered patent requiring correction and that the said Letters Patent should read as corrected below.

Column 12, line 2, for "a radical of the formula" read -- radicals of the formulas --.

Signed and sealed this 3rd day of December 1968.

(SEAL)
Attest:

Edward M. Fletcher, Jr.                        EDWARD J. BRENNER

Attesting Officer                                Commissioner of Patents